UNITED STATES PATENT OFFICE.

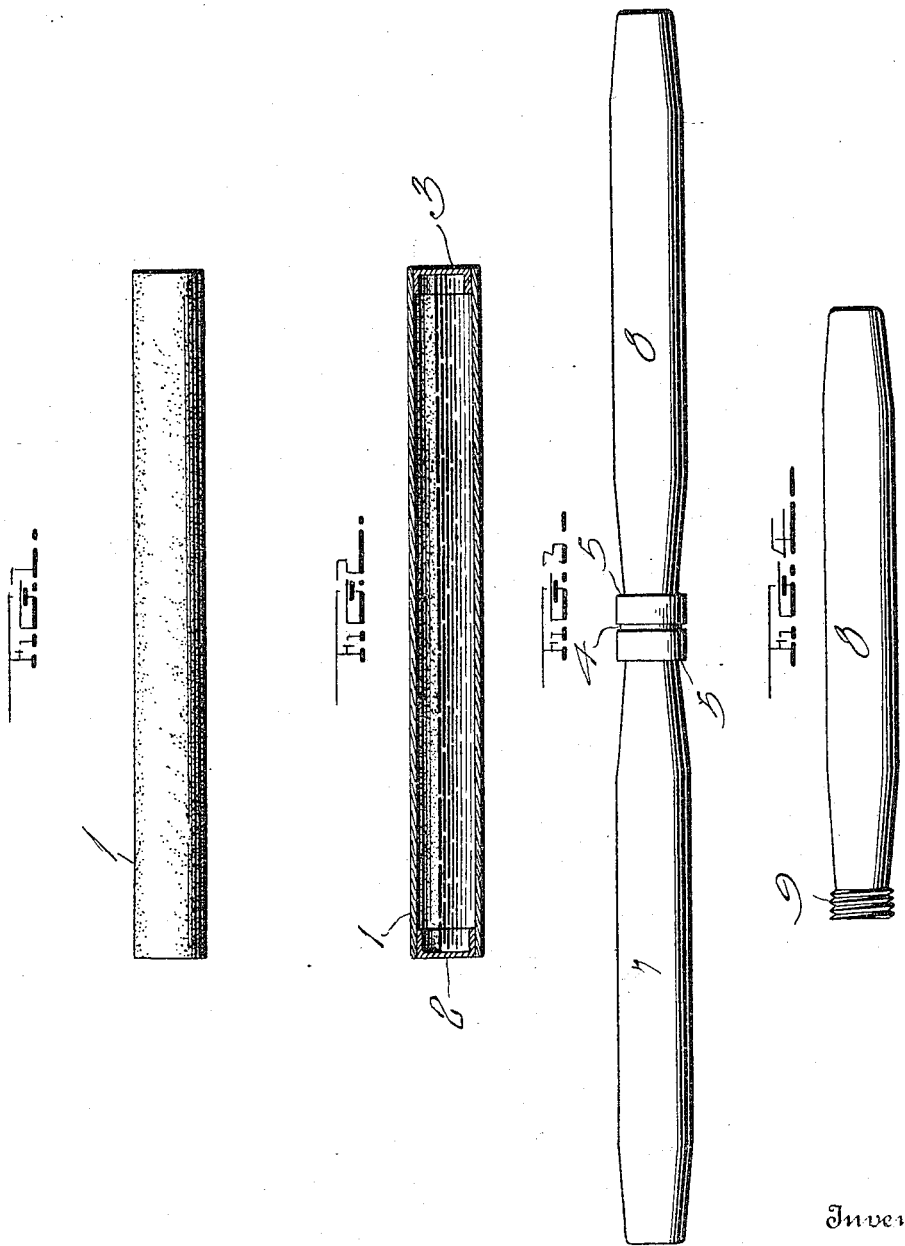

HERMAN RICKMAN, OF BUTLER, NEW JERSEY.

METHOD OF MAKING FOUNTAIN-PEN BARRELS.

1,210,842.　　　　　Specification of Letters Patent.　　Patented Jan. 2, 1917.

Application filed October 16, 1916. Serial No. 125,901.

*To all whom it may concern:*

Be it known that I, HERMAN RICKMAN, a citizen of the United States, residing at Butler, in the county of Morris and State of New Jersey, have invented certain new and useful Improvements in the Method of Making Fountain-Pen Barrels; and I do declare the following to be a full, clear, and exact description of the invention, such as will enable others skilled in the art to which it appertains to make and use the same.

This invention relates to fountain pens and more particularly to the method of making the barrels thereof.

The object of the invention is to blow the finished shape of the pen barrel, leaving very little finishing work to be done.

In the accompanying drawing in which the various steps of making a fountain pen barrel in accordance with this improved method are illustrated: Figure 1 represents a side elevation of an unvulcanized rubber tube ready for insertion within the mold; Fig. 2 represents a longitudinal section of the tube before it is placed on the vulcanizer; Fig. 3 represents a side elevation of the tube after it has been removed from the vulcanizer and which has been blown to form two connected pen barrels; and Fig. 4 represents a side elevation of one of the completed barrels formed in accordance with this method.

The method of producing fountain pen barrels in accordance with this invention comprises first cutting a tube 1 of unvulcanized rubber of the desired size and shape, then closing one end of said tube by inserting a raw rubber plug 2 therein. A small quantity of expansive fluid, preferably water, is then placed in the tube, and the other end thereof is closed with a plug 3 also composed of raw rubber. The soft rubber tube with the water therein is then placed in any suitable mold according to the shape which it is desired to impart to the barrel, and the mold containing the tube is placed in a vulcanizer and the tube properly vulcanized in the usual manner. The heat of the vulcanizer converts the water into steam within the tube 1 and this steam expanding within the tube forces the raw rubber against the mold causing it to assume the shape of the mold. After the tube has been properly vulcanized, it is removed from the mold and is then in the form shown in Fig. 3, said tube as shown being of a length suitable to produce two pen barrels 7 and 8 of ordinary length and these barrels are separated by sawing the tube transversely at the groove marked 4, shoulders 5 having been formed at the open or front ends of the barrels owing to the peculiar construction of the mold in which the tube in its raw rubber state was placed. The inside of the barrels 7 and 8 is then drilled out to form chambers of suitable size, and the sawed ends of the barrels 7 and 8 are suitably faced, it being understood that the facing consists in smoothing off these sawed ends. The closed ends of the barrels are also smoothed by a suitable tool and said barrels are then placed on mandrels in a lathe and the threads 9 cut on the shoulders 5 in the ordinary manner, said threads being designed to receive the point protecting cap, not shown. The barrel is then complete and may be equipped with the usual accessories, not shown.

From the above description, it will be obvious that two pen barrels are constructed in a single blowing operation, and that after being removed from the mold, they may be quickly and economically finished in the manner above described.

While the process has been described in making fountain pen barrels it is to be understood that it may be used for constructing other articles.

I claim:—

1. A method of making fountain pen barrels which consists in first cutting a tube of unvulcanized rubber the desired size, then inserting a raw rubber plug in one end of said tube, then placing water within the tube, then inserting a raw rubber plug in the other end thereof, then placing the closed tube within a mold, then vulcanizing the mold-inclosed tube, then cutting said tube transversely into two sections, and then finishing the sections.

2. A method of making fountain pen barrels which consists in first cutting a tube of unvulcanized rubber the desired size, then inserting a raw rubber plug in one end of said tube, then placing water within the tube, then inserting a raw rubber plug in the other end thereof, then placing the closed tube within a mold, then vulcanizing the mold-inclosed tube, then cutting said tube transversely into two sections, then drilling out the inside of the sections to form chambers of desired size, and then finishing the sections.

3. A method of making fountain pen barrels which consists in first cutting a tube of unvulcanized rubber the desired size, then inserting a raw rubber plug in one end of said tube, then placing water within the tube, then inserting a raw rubber plug in the other end thereof, then placing the closed tube within a mold, then vulcanizing the mold-inclosed tube, then cutting said tube transversely into two sections, then drilling out the inside of the sections to form chambers of desired size, then facing the cut ends of the sections and smoothing their closed ends, then placing the sections on mandrels and threading the open ends thereof.

In testimony whereof I have hereunto set my hand in the presence of two subscribing witnesses.

HERMAN RICKMAN.

Witnesses:
SIDNEY M. ROFF,
M. K. RICKMAN.

Copies of this patent may be obtained for five cents each, by addressing the "Commissioner of Patents, Washington, D. C."